Figure 1:
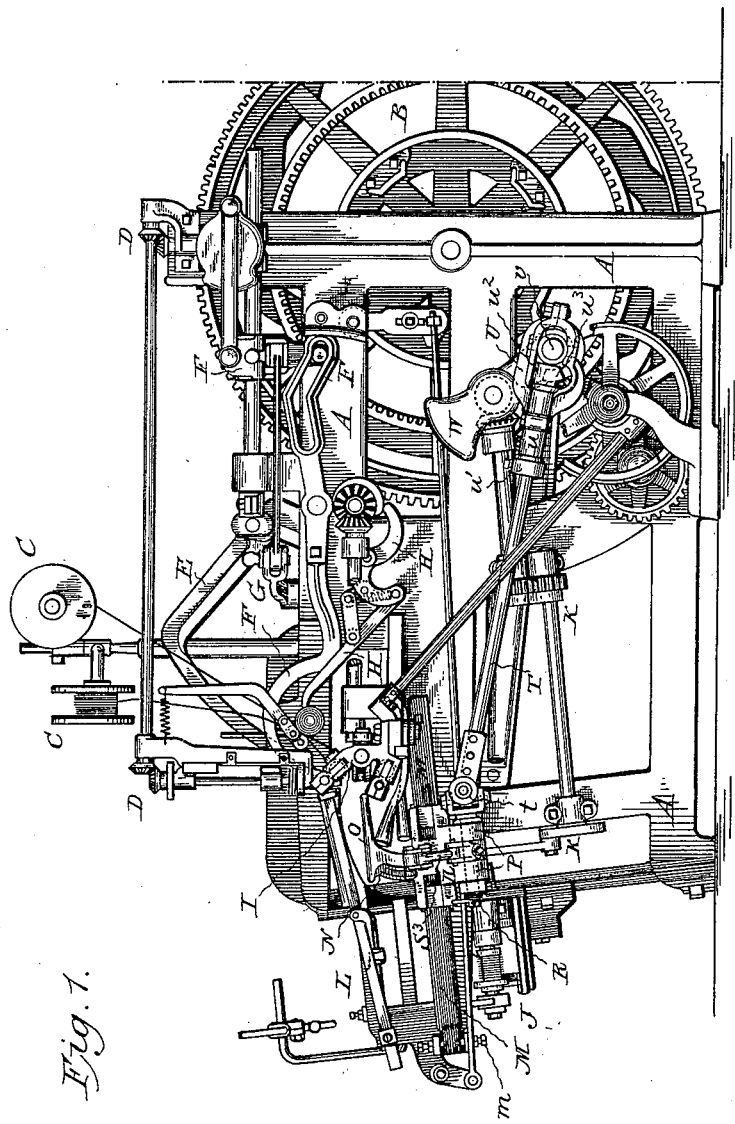

No. 666,755. Patented Jan. 29, 1901.
E. HORTON.
BASKET MAKING MACHINE.
(Application filed June 27, 1900.)
(No Model.) 2 Sheets—Sheet 1.

WITNESSES:
S. P. Hollingsworth
A. M. Parkins.

INVENTOR
Emmet Horton,
by his attorneys
Baldwin, Davidson & Wight.

No. 666,755. Patented Jan. 29, 1901.
E. HORTON.
BASKET MAKING MACHINE.
(Application filed June 27, 1900.)
(No Model.) 2 Sheets—Sheet 2.
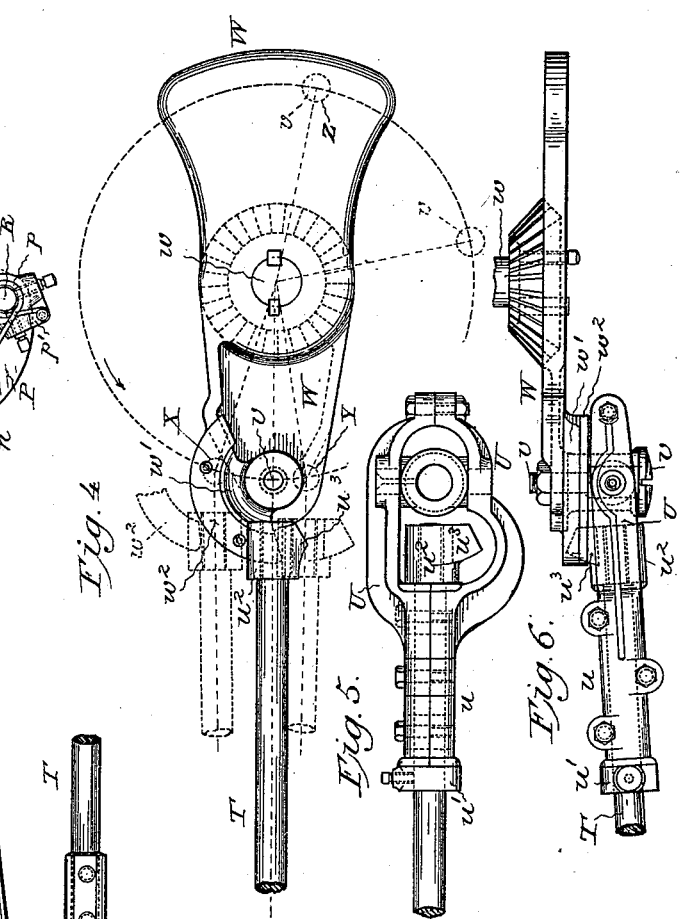
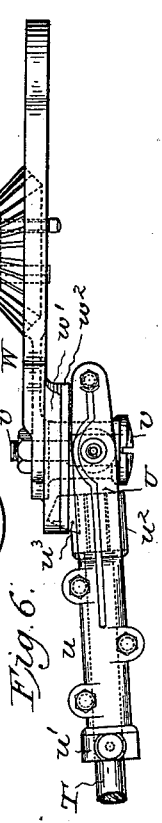
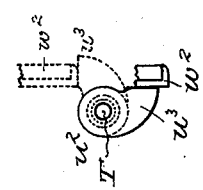
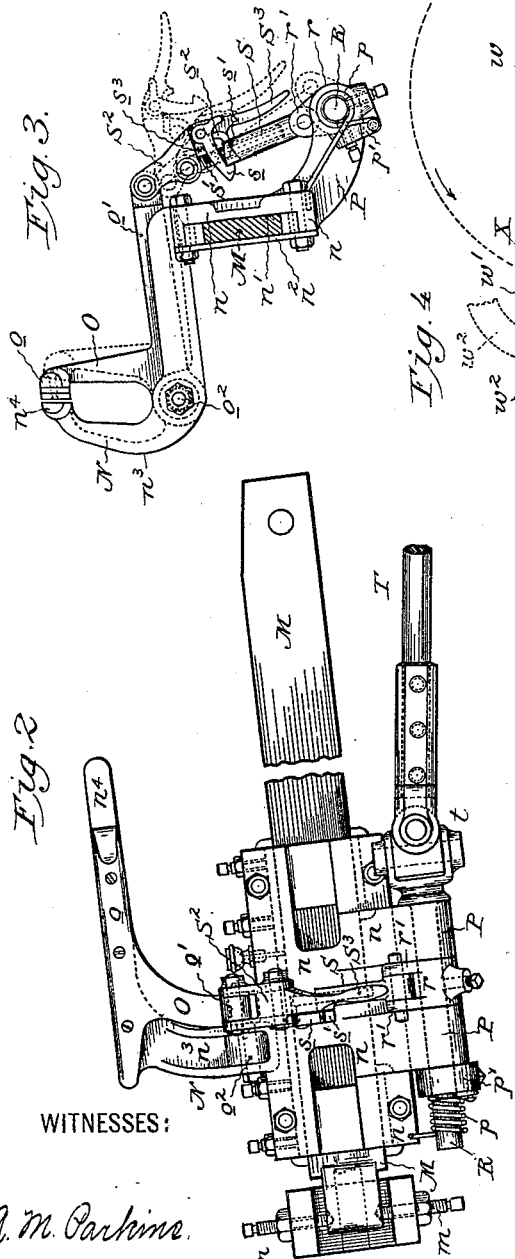
WITNESSES:
A. M. Parkins.
S. P. Hollingsworth
INVENTOR
Emmet Horton,
by his attorneys
Baldwin, Davidson & Wight

United States Patent Office.

EMMET HORTON, OF ELMIRA, NEW YORK, ASSIGNOR TO THE HORTON BASKET MACHINE COMPANY, OF NEW YORK, N. Y.

BASKET-MAKING MACHINE.

SPECIFICATION forming part of Letters Patent No. 666,755, dated January 29, 1901.

Application filed June 27, 1900. Serial No. 21,785. (No model.)

*To all whom it may concern:*

Be it known that I, EMMET HORTON, a citizen of the United States, residing at Elmira, in the county of Chemung and State of New York, have invented certain new and useful Improvements in Basket-Making Machines, of which the following is a specification.

My present invention relates to the class of basket-making machines shown in my Patents No. 530,048, of November 27, 1894, and No. 635,725, of October 24, 1899. The machines of these patents are designed to automatically make baskets of veneer by assembling the blanks for the bottoms and sides and the bands for uniting the sides at the top and bottom of the basket. The parts of the basket are automatically secured together by staples automatically formed and driven as the operation of assembling the parts progresses.

The object of my present invention is to improve the construction and operation of some of the parts of machines of this class.

In my patent of October 24, 1899, the blanks for forming the sides of the basket are taken one at a time from a magazine by a "picker," which delivers them to a "holder," from which they are taken by a "gripper" and carried to a "form," about which they are assembled and secured to other parts of the basket. In the machine shown in the patent last mentioned the gripper comprises two jaws which are automatically opened and closed at the proper times and which are moved back and forth between the sides-holder and the form. No provision is made for opening the jaws except automatically and the mechanism for operating the gripper is somewhat complicated. In the improved gripper mechanism constituting the subject-matter of my present invention the gripper-jaws may be opened and closed at the will of the attendant and the mechanism is simplified and made more easy to operate.

In the accompanying drawings, Figure 1 shows a side elevation of one of my basket-making machines similar to that shown in my patent of October 24, 1899, with my improved gripper mechanism applied. The remaining figures, which show details, are on an enlarged scale. Fig. 2 shows a side elevation of the gripper-jaws and the slide-bar on which they reciprocate. Fig. 3 shows a rear elevation of the same, the slide-bar or rail being shown in cross-section. Fig. 4 shows a side elevation of a part of the gearing which operates the pivoted jaw of the gripper, dotted lines showing different positions of part of this mechanism. Fig. 5 is a detail view, in side elevation, of the front end of the pitman-rod which operates the grippers. This figure shows also the devices employed for connecting the pitman-rod with the lever, which is rotated by gearing connecting it with the main cam and gear wheel. Fig. 6 shows a plan view of the mechanism shown in side elevation in Fig. 4. Fig. 7 is a detail view showing the manner in which the pitman-rod is turned to close the pivoted jaw of the gripper.

My present improvements relate solely to the improved gripper mechanism, so that I will describe the other parts of the machine shown in Fig. 1 in general terms only.

A indicates the frame of the machine, B the main cam and gear wheel, and C the spools of wire for supplying the material from which the staples are formed. D indicates the mechanism for operating the band-feeding devices. E is the ejector, and F the plunger forming part of the band-feeding mechanism. G indicates part of the mechanism for operating the crane which carries the bottom blanks from their magazine to the form. H indicates the mechanism for operating the wire-feeding devices. I is the staple forming and driving mechanism. J indicates part of the picker-operating mechanism. K indicates part of the mechanism for operating the picker. L indicates the holder which receives the side pieces delivered to it by the picker from the sides-magazine. All of these parts are of substantially the same construction as those shown in my patent of October 24, 1899, above referred to. The rail or slide-bar M, on which the gripper slides, is also similar to that shown in my patent last mentioned. It is slightly inclined and may be adjusted to the desired inclination by set-screws *m*.

The gripper consists of two jaws N and O. In general outlines they are similar to those heretofore employed. The jaw N projects laterally from a casting $n$, which is formed with a recess $n'$ to receive the rail M, while a plate $n^2$ holds the casting on the rail while permitting it to slide thereon. The jaw N has a vertical portion $n^3$, provided with an extended horizontally-arranged top piece $n^4$, adapted to engage the side piece. The jaw O is also provided with a top piece $o$, adapted to engage the side piece of the basket. The jaw O is pivoted to the jaw N at the lower end of the vertical portion $n^3$. The lower end of the casting $n$ is formed with downwardly-projecting arms P, through which extends a short rock-shaft R, to which is secured a sleeve $r$, having laterally-projecting arms $r'$, to the outer ends of which is pivotally connected a short tube S, screw-threaded on the inside at its upper end to receive the lower end of a screw S', which is pivoted at its upper end to a link $S^2$, in turn pivoted to the outer end of the arm $o'$ of the pivoted jaw O. The link $S^2$ is formed with a downwardly-projecting handle $S^3$, to which is pivoted a pawl $s$, that normally engages a lug $s'$ on the upper end of the tube S, thus locking the parts in such manner that the jaws can only be opened and closed automatically by the operating mechanism hereinafter described. The downward movement of the pawl $s$ is limited by a stop $s^2$ and the pawl is pressed downwardly by a spring $s^3$. A spring $p$, encircling the shaft R, has one end attached to a collar $p'$, secured to the shaft R, and its other end secured to the casting $n$. The action of this spring is to open the jaws, the jaws being closed at times by the mechanism presently to be described.

The pitman-rod T is connected by a universal joint $t$ to one end of the rock-shaft R, and at its opposite end it extends loosely through a sleeve $u$, forming part of a yoke U. A collar $u'$, secured to the rod T and bearing against the outer end of the sleeve $u$, prevents the rod from moving in one direction endwise relatively to the sleeve, and a collar $u^2$, secured to the extreme end of the rod T within the yoke, prevents the rod from moving relatively to the sleeve in the opposite direction. This collar $u^2$ is provided with a laterally-projecting lug $u^3$, for a purpose hereinafter described. The arrangement is such that the rod may turn freely in the sleeve, but is prevented from moving endwise therein. The yoke U is connected in the manner shown to a crank-pin $v$ on the lever W, which latter is secured to a shaft $w$, operated by suitable gearing from the main cam and gear wheel B. The lever W is formed with an extension $w'$, to which is secured a wearing-plate $w^2$, adapted to engage with the lug $u^3$. As the lever W is rotated it causes the pitman T and the gripper to be reciprocated. At certain times the plate $w^2$ engages the lug $u^3$ and turns the pitman T, which imparts a corresponding movement to the rock-shaft R, causing the gripper-jaws to close. When the gripper is in a position close to the form and is delivering a side piece thereto, the plate $w^2$ is not in engagement with the lug $u^3$ and the jaws of the gripper are therefore open, and the plate remains out of engagement with the lug $u^3$ and allows the jaws to remain open during the outward movement of the gripper away from the form and until a side piece has been received between the jaws of the gripper. As soon as this takes place the plate $w^2$ engages the lug $u^3$ and the pitman-rod T is rotated in such manner as to close the jaws, thus firmly grasping the side piece held between them. As soon as the gripper reaches the form the plate $w^2$ again leaves the lug $u^3$ and the spring opens the jaws.

Fig. 4 indicates diagrammatically the operation of the mechanism for opening and closing the jaws. When the crank-pin $v$ is in the position indicated by X, the plate $w^2$ will come into contact with the lug $u^3$, as indicated by dotted lines. When the crank-pin $v$ is in the position indicated by the dotted lines Y, the plate is still in engagement with the lug and remains in engagement therewith until the pin $v$ has reached the position indicated at Z. The movement of the crank-pin from the point X to the point Z corresponds with the movement of the gripper while carrying a side piece to the form. After passing the point Z the plate $w^2$ leaves the lug $u^3$ and the spring $p$ causes the jaws to open, and they remain thus open during the backward movement of the gripper. By this mechanism the gripper-jaws are automatically operated to receive side pieces one at a time from the holder, carry them to the form, and deliver them thereto, being closed automatically just after receiving a side piece, opened automatically to deliver it, held open during its backward movement, and then closed automatically after receiving a new side piece.

It is sometimes desirable to give more or less pressure to the gripper-jaws. This may be effected in my improved machine by means of the sleeve S and screw S'. The screw may be adjusted in the sleeve to vary the length of the connection between the link $S^2$ and the arms $r'$, and thus vary the pressure. It is also sometimes desirable to remove a side piece after it has been grasped by the gripper or to adjust it. Sometimes the machine is stopped while the gripper contains a side piece and it is desirable to remove it, and sometimes the gripper does not hold a side piece in the desired position. I have provided devices in the present machine by which the side piece may be removed or adjusted without moving the other parts of the mechanism. It will be observed that the handle $S^3$ is held down by the pawl $s$. The pawl is pivoted to the handle and engages the lug $s'$ on the sleeve S. This is the normal condition of the mechanism when working automatically and the pivoted jaw of the gripper is opened and closed automatically during the operation of the machine. If it is desired to open the jaws while the machine is operating or while the gripper is grasping a side piece, it may be done by disengaging the pawl s from the lug s' and moving the handle S³ upward in the manner indicated by dotted lines in Fig. 3. This movement of the handle will cause the pivoted jaw to rock on its pivot o² in the manner indicated by dotted lines in Fig. 3. After the side piece is removed or adjusted the handle may be lowered and the pawl engaged with the lug s', and then the machine may operate automatically in the usual manner.

In my patent of October 24, 1899, No. 635,725, the grippers are opened and closed by a lever connected by means of a link to an oscillating lever, in turn operated by a pitman. The lever which opens and closes the jaws also affords a connection between the gripper and the means for reciprocating it on the slide-bar or rail.

In the operation of the machine of my patent above mentioned it was found that there was a tendency for the jaws to open prematurely or at the wrong time, and thus drop the side piece arranged between the jaws. In the former mechanism there was some lost motion at each end of the stroke, as the lever connected with the movable jaw of the gripper would oscillate before moving the grippers on the slide-bar. By reason of this the jaws tended to open or close, either because the lever would swing without moving the jaws on the slide-bar or the lever would be held stationary and the gripper would slide on the bar. Thus if the machine were stopped suddenly the gripper would continue to travel and would open and drop the side piece. To prevent this, I introduced a friction-spring between the gripper and the slide-bar. This is indicated in Fig. 1 of my patent above mentioned, but is not described therein. The arrangement was such that considerable friction was introduced between the base of the gripper and the slide-bar, so that the gripper would not tend to slide on the bar until moved positively by the operating mechanism at the proper time. The friction thus produced was so great as to be objectionable and to hinder to some extent the free action of the machine and cause wear on some of the parts. By my present improvements I dispense with these friction devices, and hence very materially increase the efficiency of the mechanism.

I claim as my invention—

1. In a basket-making machine, the combination of a gripper comprising jaws one of which is movable, a pitman for reciprocating the gripper, devices connecting the pitman with the movable gripper-jaw and means for turning the pitman to move the movable jaw.

2. The combination of a fixed jaw, a movable jaw, a spring for moving the jaw in one direction, a pitman for reciprocating the jaws, devices connecting the pitman with the movable jaw and means for turning the pitman to move the movable jaw in a direction opposed to the action of the spring.

3. The combination of a fixed jaw, a movable jaw, a rock-shaft to which the movable jaw is connected, a spring for moving the rock-shaft in one direction, a pitman for reciprocating the jaws, devices connecting the pitman with the rock-shaft and means for turning the pitman to move the rock-shaft in a direction opposed to the action of the spring.

4. The combination of the gripper-jaws, means for reciprocating the jaws, means for opening and closing the jaws automatically, and devices for opening and closing the jaws at the will of the attendant.

5. The combination of a fixed jaw, a movable jaw, a rock-shaft, means for turning the rock-shaft in opposite directions to open and close the jaws automatically, and devices interposed between the rock-shaft and the movable jaw operated at the will of the attendant to open and close the jaws.

6. The combination of a fixed jaw, a movable jaw, a rock-shaft, link connections between the rock-shaft and the movable jaw, a handle carried by the link connections, and a pawl carried by the handle and engaging the link connections.

7. The combination of a fixed jaw, a movable jaw, a rock-shaft and adjustable connections between the rock-shaft and the movable jaw.

8. The combination of a fixed jaw, a movable jaw, a rock-shaft, a screw-threaded sleeve, a screw, and movable connections between the sleeve, screw, movable jaw and rock-shaft.

9. The combination of a fixed jaw, a movable jaw pivoted thereto, a rock-shaft, a sleeve pivotally connected therewith, a link pivotally connected with the movable jaw, a screw pivoted to the link and engaging the sleeve, a handle on the link and a pawl engaging the sleeve.

10. The combination of the gripper-jaws, one of which is movable, a pitman-rod, connections between the pitman-rod and the jaws for reciprocating the jaws, devices connecting the pitman-rod with the movable jaw to move it relatively to the other jaw, a rotating lever to one end of which the pitman-rod is pivotally connected, and devices carried by the lever and engaging the pitman-rod to turn it.

11. The combination of the gripper-jaws one of which is movable, a pitman-rod connected therewith to reciprocate the jaws, devices connecting the movable jaw with the pitman-rod for moving it relatively to the other jaw, a rotating lever, a yoke connected with the pitman-rod and pivotally connected with the lever, a lug on the end of the pitman-rod, and a plate on the lever engaging the lug.

12. The combination of the gripper-jaws one of which is movable, a pitman connected therewith for reciprocating the jaws, devices connecting the movable jaw with the pitman for moving said jaw relatively to the other jaw, a yoke having a sleeve through which the pitman-rod extends, means for preventing endwise movement of the pitman-rod in the sleeve, a lug projecting from the end of the rod, a rotating lever pivotally connected with the yoke, and a plate on the lever engaging the lug on the pitman-rod.

In testimony whereof I have hereunto subscribed my name.

EMMET HORTON.

Witnesses:
W. M. UFFORD,
J. B. COLEMAN.